US008974974B1

(12) United States Patent
Scanlon, Jr. et al.

(10) Patent No.: US 8,974,974 B1
(45) Date of Patent: Mar. 10, 2015

(54) CLASS OF SOLID-STATE ELECTROLYTES FOR RECHARGEABLE LITHIUM BATTERIES

(75) Inventors: Lawrence G. Scanlon, Jr., Fairborn, OH (US); Joseph P. Fellner, Kettering, OH (US); William A. Feld, Beavercreek, OH (US); Leah R. Lucente, Beavercreek, OH (US); Jacob W. Lawson, Springfield, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 534 days.

(21) Appl. No.: 13/156,775

(22) Filed: Jun. 9, 2011

(51) Int. Cl.
*H01M 10/0562* (2010.01)
(52) U.S. Cl.
USPC ............................ 429/306; 429/310; 429/314
(58) Field of Classification Search
USPC .......................................... 429/310, 328, 322
See application file for complete search history.

(56) References Cited

U.S. PATENT DOCUMENTS

| 5,932,133 | A | 8/1999 | Scanlon, Jr. |
| 6,010,805 | A | 1/2000 | Scanlon, Jr. et al. |
| 6,541,161 | B1 | 4/2003 | Scanlon, Jr. |

OTHER PUBLICATIONS

L.G. Scanlon et al., "Low Energy of Activation Lithium Ion Conducting Channel", presented at the 216th Electrochemical Society Meeting, Vienna, Austria, Oct. 2009 and full manuscript submitted for publication to ECS Transactions.

L. G. Scanlon et al., "Low energy of activation lithium-ion conducting channel," ECS Trans., vol. 25 (2010) 163-167.
S. Okada et al., "Intercalation mechanism in lithium/iron-phthalocyanine cells," J. Electrochem. Soc., vol. 136 (1989) 340-344.
J-I. Yamaki et al., "Phthalocyanine cathode materials for secondary lithium cells," J. Electrochem. Soc., vol. 129 (1982) 5-9.
L. G. Scanlon et al., "Hydrogen storage based on physisorption," J. Phys. Chem. B., vol. 113 (2009) 4708-4717.
K. Lamonte et al., "Molecular dynamics simulations of H2 adsorption in tetramethyl ammonium lithium phthalocyanine crystalline structures," J. Phys. Chem. B., vol. 112 (2008) 15775-15782.
P. B. Balbuena, "Modeling lithium-ion conducting channel," Aerospace Power Scholarly Research Program, Delivery Order 0011, ARFL-PR-WP-TR-2005-2190 (2005) 24 pages total.
W. A. Feld, "Single lithium ion conducting polymer electrolyte," Aerospace Power Scholarly Research Program Delivery Order 0011, AFRL:-PR-WP-TR-2005-2197 (2005) 29 pages total.
W. A. Feld, "Single lithium ion conducting polymer electrolyte," Aerospace Power Scholarly Research Program Delivery Order 0007, AFRL-PR-WP-TR-2005-2185 (2005) 21 pages total.
Z. Florjanczyk, "Novel, solvent-free, single ion-conductive polymer electrolytes," FA8655-05-1-3014 (2008) 74 pages total.
B. Scrosati, "Novel, solvent-free, single ion conducting polymer electrolytes," Final Report in F61775-01-WE021 (2004) 15 pages total.
A. Turner, "Single ionic conducting polymer electrolyte," Aerospace Power Scholarly Research Program Delivery Order 0011, AFRL-PR-WP-TR-2005-2189 (2005) 19 pages total.
A. Turner, "Single ionic conducting solid-state electrolyte," Power and Thermal Technologies for Air and Space Delivery Order 0001, AFRL-PR-WP-TR-2006-2164 (2005) 22 pages total.

*Primary Examiner* — Patrick Ryan
*Assistant Examiner* — Lucas J. O'Donnell
(74) *Attorney, Agent, or Firm* — AFMC LO/JAZ; Chastity Whitaker

(57) ABSTRACT

A solid-state electrolyte for rechargeable lithium batteries. The solid state electrolyte comprises a large unsaturated aromatic anion and a lithium charge carrier. The large unsaturated aromatic anion is selected from a di-lithium phthalocyanine and a di-lithium porphyrin, wherein one of the lithium ions of the unsaturated aromatic anion is replaced with a nitrogenous cation.

5 Claims, 2 Drawing Sheets

CLASS OF SOLID-STATE ELECTROLYTES FOR RECHARGEABLE LITHIUM BATTERIES

STATEMENT OF GOVERNMENT INTEREST

The invention described herein may be manufactured and used by or for the Government for governmental purposes without the payment of any royalty thereon.

FIELD OF THE INVENTION

This invention relates to solid-state electrolytes for rechargeable lithium batteries.

BACKGROUND OF THE INVENTION

Solid state electrolytes are very attractive for use with lithium-ion batteries since these electrolytes, as compared to liquid-based non-aqueous electrolytes, are non-flammable. The solid state electrolytes have specific ionic conductivities on the order of $10^{-3}$ S/cm, which is comparable to liquid-based non-aqueous electrolytes. Furthermore, with a lithium ion transfer number of unity, concentration gradients at high discharge rates can be avoided with solid state electrolytes that otherwise would occur within liquid-based electrolytes under the same operating conditions.

Lithium Phosphorus Oxynitride ("LIPON"), for example, is currently used as a solid-state electrolyte in rechargeable lithium cells operable at ambient temperatures and where high capacity cells are not a requirement. However, LIPON has a low specific ionic conductivity (i.e., on the order of $10^{-6}$ S/cm at room temperature) with high activation energy ($E_a$) of 53 kJ/mol. Additionally, sputtering of LIPON is required for electrochemical cell integration, which increases the cost and fabrication difficulty for a large area, pin-hole free electrolytes.

Other solid-state electrolytes are currently available with specific lithium ionic conductivities on the order of $10^{-3}$ S/cm at room temperature. These include: (1) highly lithium ion conducting glass-ceramic solid-state electrolytes based on $Li_2S$—$P_2S_5$ with an $E_a$ of 12 kJ/mol—processing of these materials requires the use of an Argon-filled dry box; (2) thio-LISICON-lithium superionic conductor ($Li_{3.25}S$—$Ge_{0.25}$—$P_{0.75}S_4$), $E_a$ of 20-45 kJ/mol as a function of heat treatment temperature; and (3) Ohara glass ceramic, $E_a$ of ~35 kJ/mol.

Despite these benefits to solid-state electrolytes (including fast lithium ion conduction properties), the integration of solid-state electrolytes into cell components can be impeded by high-impedances at the glass-ceramic solid-state electrolyte/electrode interface. While conventional approaches have used intermediate layers, such as LIPON or polymer based electrolytes, to facilitate connection between the glass-ceramic electrolyte and electrode, these approaches can be costly or introduce additional problems into the battery.

SUMMARY OF THE INVENTION

According to embodiments of the present invention, a low energy of activation lithium ion conducting channel based on di-lithium phthalocyanine ($Li_2Pc$) may be incorporated into a solid-state rechargeable lithium battery. For example, a thin film of $Li_2Pc$ has an $E_a$ of 6.1 kJ/mol and a specific ionic conductivity of $10^{-3}$ S/cm over a temperature range from $-50$ °C. to $+50$ °C. While $Li_2Pc$ is an ionic conductor, it is also an electronic conductor. Accordingly, hybrids of $Li_2Pc$ may be used to reduce or eliminate the electronic conductivity issues associated with $Li_2Pc$. The hybrids maintaining the high lithium ion conductivity associated with $Li_2Pc$ but have an added benefit of being soluble in common non-aqueous solvents. Therefore, the hybrids may be deposited by inkjet processing, creating a cost effective method for integration of cell components.

More generally, and according to other embodiments of the present invention, a solid-state electrolyte for rechargeable lithium batteries includes materials that are fast lithium ion conductors, electronically insulating, functional over a broad temperature range, stable up to at least 200 °C., and free of any non-aqueous electrolyte, thereby avoiding potential fire hazards. According to some aspects of the present invention, the solid-state electrolytes may be deposited using a low cost inkjet process for cell integration because the solid-state electrolyte materials are soluble in common organic solvents.

In particular, emobidments of the solid-state electrolytes of the present invention comprise a large unsaturated aromatic anion and a lithium ion charge carrier. The large unsaturated aromatic anion is selected from the group consisting of di-lithium phthalocyanine and di-lithium porphyrin, wherein one of the lithium ions is replaced with a nitrogenous cation. Preferably, the nitrogeneous cation is selected from the group consisting of tetraalkylammonium, imidazolium, pyridinium and mixtures thereof and whose components can contain atoms other than carbon. The lithium salt is preferably selected from the group consisting of lithium iodide, lithium bromide, lithium chloride, lithium fluoride, lithium bis(trifluoromethanesulfonyl)imide (LiTFSI), and mixtures thereof.

The purpose of the nitrogenous cation is to separate the large unsaturated aromatic anion within the molecular lattice so as to avoid electronic conduction via $\pi$ orbital overlap. For example, it has been experimentally verified that 18 crown-6 ether functions in an analogous fashion when added to di-lithium phthalocyanine in a 1:1 mole ratio. Other crown ethers or those where the donor oxygen atoms have been replaced with nitrogen donor atoms may function in a similar fashion.

The mole ratio of lithium salt to the nitrogenous cation-lithium-phthalocyanine or nitrogenous cation lithium porphyrin ranges from 0.1 to 4.5.

In a preferred embodiment, the nitrogenous cation-lithium-phthalocyanine is 1,3-bis(1-adamantyl)imidazolium lithium phthalocyanine or tetrabutylammonium lithium phthalocyanine.

DETAILED DESCRIPTION

Figure 1:
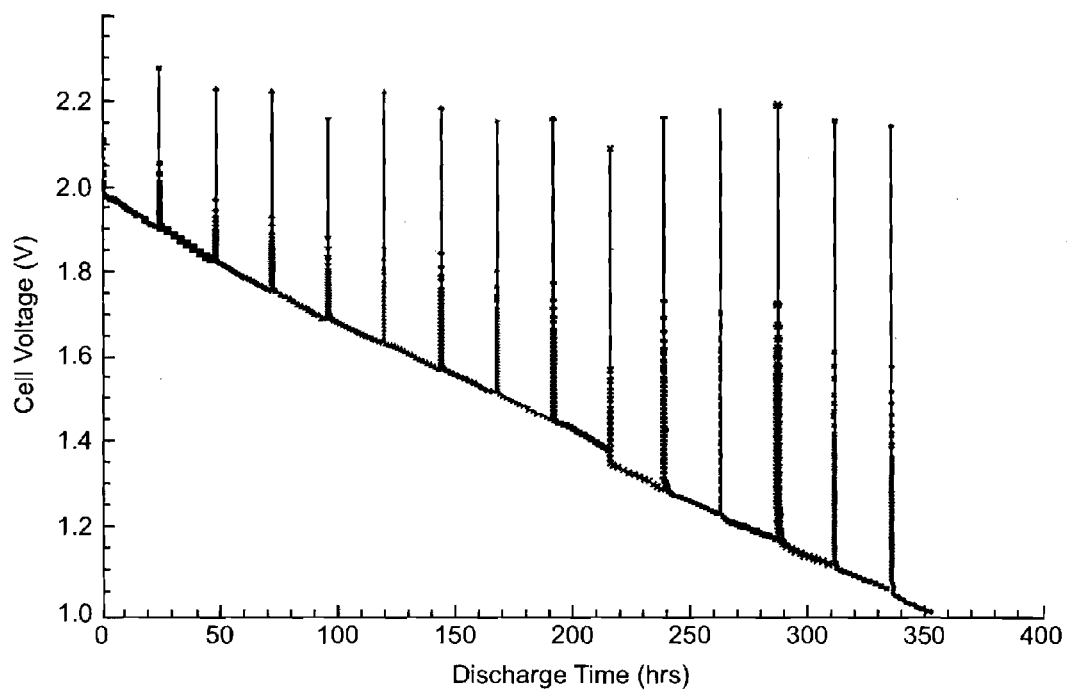
FIG. 1 is graphical representation of discharge of a 4marc cell at 19.7 µA/cm², 75° C. in 24 hr increments, and to a cutoff voltage of 1.0 V for a total time of 363 hr.

Using thin films of di-lithium phthalocyanine ($Li_2Pc$) that had been solution cast onto a manganese dioxide cathode, it has been demonstrated that the material is a fast ionic conductor with specific ionic conductivities on the order of $10^{-3}$ S/cm for temperatures ranging from $-50$ °C. to $+50$ °C. and an Arrhenius activation energy of 6.1 kJ/mol. For comparison, a pressed pellet of single crystals of $Li_2Pc$ at 21° C., 710

μm thick, area of 1.6 cm$^2$, and sandwiched between gold electrodes has a specific ionic conductivity of $1.6\times10^{-4}$ S/cm at 21° C. and a specific electronic conductivity of $2.9\times10^{-5}$ S/cm at 21 ° C. The $E_a$ for lithium ion conduction within single crystals of Li$_2$Pc is 3.7 kJ/mol over a temperature range from 0 ° C. to +50 ° C. Since the energies of activation of the thin film and single crystals of Li$_2$Pc are very similar, it is concluded that the ionic transport mechanism is the same in both.

X-ray structural results for Li$_2$Pc show that the lithium ion in the complex anion, (Li-Pc)$^{-1}$, is located in the center of the phthalocyanine (Pc) ring, and that the Pc rings are separated by about 3.5 Å. The close spacing between the Pc rings would account for the high electronic conductivity observed with Li$_2$Pc.

Without being bound by theory, it is proposed that lithium ion transport within Li$_2$Pc takes place between the planes of the complex anions and is dependent on the three-dimensional negative electrostatic potential field generated by electron delocalization taking place within the complex anion, (Li-Pc)$^{-1}$. This lithium ion transport within Li$_2$Pc is analogous to a lithium intercalation process whereby lithium ion diffusion takes place between the π-orbitals of graphene planes. Consistent with this, the $E_a$ for lithium intercalation in graphite is 5.1 kJ/mol and is of the same magnitude as the $E_a$ for Li$_2$Pc.

As described above, an array of complex anions of (Li-Pc)$^{-1}$ is required for fast lithium ion conduction. However, the Pc rings must be separated by more than 4.0 Å to preclude π-orbital overlap, which is responsible for electronic conduction. To prevent electronic conduction while still maintaining fast lithium ion transport, one of the lithium ions in Li$_2$Pc is replaced with a large cation, such as 1,3-bis(1-adamantyl) imidazolium (BAI). In this fashion, a totally new material, 1,3-bis(1-adamantyl)imidazolium lithium phthalocyanine (BAI-LiPc), was formed. X-ray structural analysis of BAI-LiPc shows that the Pc rings are separated by 8 Å. An impedance analysis of a pressed pellet of BAI-LiPc at 21° C., 850 μm thick, area of 1.6 cm$^2$, and sandwiched between stainless steel electrodes had a total cell resistance of $1.0\times10^9\Omega$ and a high frequency intercept of about 500Ω. This corresponds to a specific ionic conductivity of $1.06\times10^{-4}$ S/cm at 21° C and a specific electronic conductivity of $5.3\times10^{-11}$ S/cm. The specific ionic conductivity is very similar to that of a pressed pellet of single crystals of Li$_2$Pc, which further emphasizes the importance of the complex anion, (Li-Pc)$^{-1}$, for fast ionic conduction.

In like fashion, replacement of a lithium ion in Li$_2$Pc with a large tetrabutyl-ammonium ("TBA") cation yields similar results. Impedance analysis of a pressed pellet of TBA-LiPc sandwiched between stainless steel electrodes at 21° C., 840 μm thick, and an area of 1.6 cm$^2$ has a high frequency intercept of about 500Ω and a total cell resistance of $5.0\times10^7\Omega$. The corresponding specific ionic and electronic conductivities are $1.05\times10^{-4}$ S/cm and $1.05\times10^{-9}$ S/cm, respectively.

Correspondingly, the addition of 18 crown-6 ether in a 1:1 mole ratio with di-lithium phthalocyanine results in a solid-state electrolyte with a specific ionic conductivity of $5.5\times10^{-4}$ S/cm and an electronic conductivity of $6.9\times10^{-9}$ S/cm at 21° C. Pressed pellets of this material 890 μm thick with an area of 1.6 cm$^2$ have a high frequency intercept of about 100Ω and a total cell resistance of $8.0\times10^6\Omega$.

In past experiments investigating the reactivity between lithium metal and Li$_2$Pc, it was observed that total cell resistance would decrease from tens to hundreds of kilo-ohms to ohms. Furthermore, during an in situ Lithium-7 NMR/electrochemical experiment the signal due to lithium metal disappeared as a function of time and cycling and there was a corresponding increase in the Lithium-7 signal associated with a lithiated Li$_2$Pc. Thus, symmetrical lithium cells were prepared using BAI-LiPc and TBA-LiPc to test their electrochemical stability with respect to lithium metal, i.e., Li/Pressed Pellet of BAI-LiPc/Li or Li/Pressed Pellet of TBA-LiPc/Li. The same pressed pellets of BAI-LiPc and TBA-LiPc that were used with symmetrical stainless steel electrodes described above were used in these tests. After approximately six months in contact with lithium metal and subjected to periodic high temperatures of 80 ° and 90 ° C., there appeared to be very little reaction between lithium metal and BAI-LiPc as the total cell resistance ($3\times10^9\Omega$) was the same as the initial cell resistance at the onset of testing. Exposure to high temperature at 90 ° C. for three days did result in lower resistance ($1\times10^8\Omega$) during testing. Once the cell was brought back to ambient conditions, however, the total resistance was once again $3\times10^9\Omega$, corresponding to a specific electronic conductivity of $1.8\times10^{-11}$ S/cm. Symmetrical lithium cells using a pressed pellet of TBA-LiPc also showed very little change in total cell resistance after testing for approximately one month. The total cell resistance remained fairly constant at $3\times10^{10}\Omega$ with a corresponding electronic conductivity of $1.8\times10^{-12}$ S/cm at 21° C.

The stability tests imply that, in order to use BAI-LiPc or TBA-LiPc as a solid-state electrolyte for rechargeable lithium batteries, it is necessary to introduce lithium ion charge carriers into the molecular lattice. The complex anion, (Li-Pc)$^{-1}$, provides "sites" or in this case, regions, of negative electrostatic potential fields that support lithium ion conduction through the molecular lattice. This situation is somewhat analogous to high-conducting solid-electrolytes based on tetraalkylammonium iodide-silver iodide double salts. In that particular molecular system, it is proposed that conducting sites for silver ions are provided by iodide tetrahedra that share faces to permit silver ion diffusion throughout the anion lattice. The activation energies for these types of tetraalkylammonium iodide-silver iodide double salts varies from 15 kJ/mol to 16.7 kJ/mol over a temperature range from −50 ° C. to about 100 ° C, in comparison to 3.7 kJ/mol to 6.1 kJ/mol for Li$_2$Pc. Although the anion molecular lattices for BAI-LiPc or TBA-LiPc provide a similar network for ion conduction, it is necessary to populate these sites with lithium ion charge carriers if the molecular lattices are to be used as solid-state electrolytes for rechargeable lithium batteries.

One method to introduce lithium ion charge carriers into the molecular lattice of the solid-state electrolyte is to utilize the inherent reactivity of lithium metal with Li$_2$Pc to form a "lithium composite anode." The cell configuration for this experiment was "Li composite anode"/solution cast film (about 10 μm thick) of 10 wt % BAI-LiPc/90 wt % Li$_2$Pc/thin film cathode (about 130 μm thick) consisting of 78.2 wt % manganese dioxide, 7.5 wt % carbon, 7.6 wt % Kynar, and 6.7 wt % Li$_2$Pc. The "Li composite anode" consisted of a thin lithium foil, 160 μm thick, pressed onto a pressed pellet of Li$_2$Pc (about 100 mg, about 500 μm thick). Since the cell configuration incorporated the use of a pressed pellet, the electrochemical cell, designated "4marc", was tested at 75 ° C.

The results of this experiment are shown in FIG. 1. The cell was discharged at a constant current of 25 μA with a cell area of 1.27 cm$^2$ for 24 hr increments for a total discharge time of 363 hr. The symbols at the top of FIG. 1 represent the open circuit voltage of the cell after a 24 hr discharge but prior to the next 24 hr discharge. The slight disconnect at approximately 210 hr and 220 hr is due to a power outage where approximately 11 hr of discharge data was not stored electronically. Independent testing of cell designated 4marb with the same cell configuration and test parameters as 4marc, showed similar behavior; 4marb was discharged for a total time of 255 hr.

A second method of introducing lithium ion charge carriers into the new class of solid-state electrolytes is to add a lithium salt (iodide, bromide, chloride, or fluoride as a function of oxidation stability) or lithium bis(trifluoromethanesulfonyl) imide (LiTFSI)) to TBA-LiPc in varying molar ratios. In order to test this idea, one mole of lithium iodide was added to one mole of TBA-LiPc. In a separate experiment one mole of lithium iodide was added to four moles of TBA-LiPc. These experiments were accomplished by dissolving each material separately in very dry acetone in a dry room environment (where the relative humidity was less than 1%), and then filtering each solution. The lithium iodide solutions remained colorless throughout the entire process, which indicated that the iodide anion was not oxidized. Once each solution was filtered, one mole of the TBA-LiPc solution was combined with one mole of the lithium iodide solution in a glass vessel. Upon slow evaporation of the solvent over a period of days, the remaining crystalline powder was dried at 150 ° C. under a vacuum for about 18 hr. Impedance analysis of a pressed pellet of the 1:1 molar ratio of TBA-LiPc to LiI sandwiched between stainless steel electrodes at 21 ° C., 613 µm thick, and an area of 1.6 $cm^2$ had a high frequency intercept of about 182Ω and a total cell resistance of 113 kn. The corresponding specific ionic and electronic conductivities are $2.08 \times 10^{-4}$ S/cm and $3.3 \times 10^{-7}$ S/cm, respectively. Impedance analysis of the pressed pellet with the 4:1 molar ratio of TBA-LiPc to LiI sandwiched between stainless steel electrodes at 21° C., 900 µm thick, and an area of 1.6 $cm^2$ had a high frequency intercept of about 189Ω and a total cell resistance of 125 kΩ. The corresponding specific ionic and specific electronic conductivities are $3.0 \times 10^{-4}$ S/cm and $4.5 \times 10^{-7}$ S/cm, respectively.

It should be noted that the specific ionic conductivity of LiI at room temperature is on the order of $10^{-7}$ S/cm. The specific ionic conductivity of silver iodide is $3 \times 10^{-4}$ S/cm at 22° C., whereas with the electrolyte formed from six moles of silver iodide and one mole of tetramethyl ammonium iodide had a specific ionic conductivity of $4 \times 10^{-2}$ S/cm at 22 ° C. Applicants' experimental results suggest there is a three order of magnitude increase in specific ionic conductivity. Since the specific ionic conductivities for all three experiments, i.e., TBA-LiPc; TBA-LiPc:LiI; and 4TBA-LiPc:LiI, are essentially the same value of $10^{-4}$ S/cm at 21° C., it would suggest that the same molecular species, i.e., the complex anion (LiPc)$^{-1}$, is responsible for the fast ionic conduction in all cases.

Figure 2:
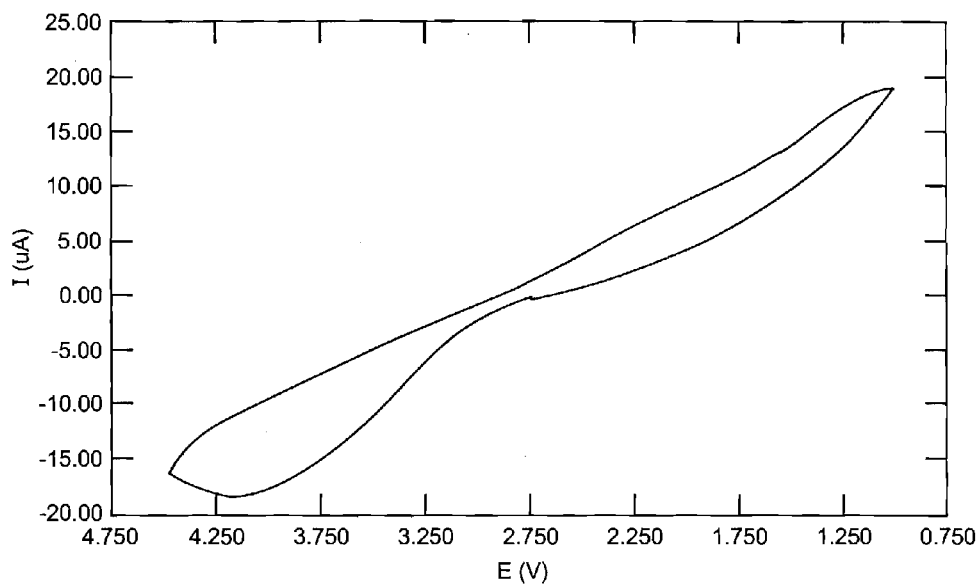
FIG. 2 is a slow scan cyclic voltammogram, 0.1 mV/s, of a cell with Li foil anode/TBA LiPc-LiI.

FIG. 2 illustrates the behavior of solid-state electrolyte in the form of a pressed pellet using TBA-LiPc-LiI in a 1:1 molar ratio. The cell configuration is an unsymmetrical cell using a lithium foil anode and a nickel working electrode. A slow scan cyclic voltammogram was run at near equilibrium conditions with a scan rate of 0.1 mV/s so as to test the reversibility of the cell upon discharging/charging. The test was run at 75 ° C. because a pressed pellet of TBA-LiPc-LiI was used in the test. The test results suggested good reversibility based on similar peak current amplitudes and area under the curves for the reduction/oxidation steps.

The experiments mentioned above use pressed pellets of materials in the various cell configurations. Since the newly developed solid-state electrolytes are soluble in common organic solvents such as N-methyl-2-pyrrolidone (NMP), inkjet processing is amenable for cell fabrication.

Figure 3:
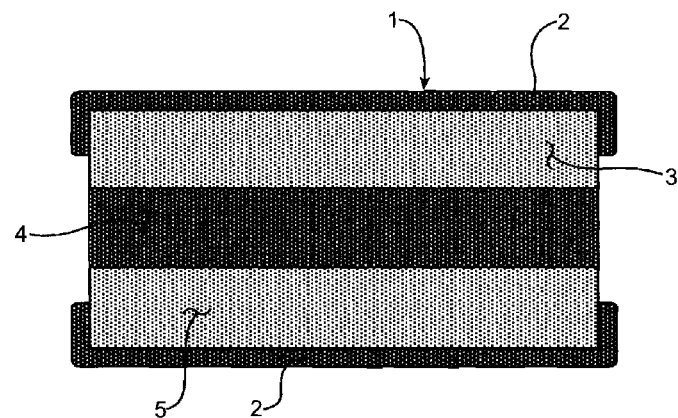
FIG. 3 is a schematic representation of a thin film rechargeable lithium cell incorporating the new solid-state electrolyte as a thin film.

FIG. 3 shows the schematic of a thin film cell (1) with metallic current collectors (2). The inkjet process can be used to form the cathode with, for example, 50 wt % $Li_2Pc$, 40 wt % acetylene black, and 10 wt % Kynar binder. Once the cathode (5) is formed, BAI-LiPc, as the solid-state electrolyte (4), may also applied via inkjet. When using BAI-LiPc as the solid-state electrolyte, it would be necessary to introduce charge carriers via "Lithium composite anode." To form this anode (3), $Li_2Pc$ would be deposited via inkjet onto the solid-state electrolyte, and then a thin film of lithium can be added directly to this layer either as a thin metal foil or by vapor deposition of lithium. The solvent system used for the inkjet process would be 40% by volume NMP and 60% by volume terpineol. Bai-LiPc and $Li_2Pc$ are soluble in NMP.

For use in a cell, the positive and negative electrodes and the solid-state electrolyte of this invention must be assembled into a package. Design and fabrication of suitable packaging arrangements are within the purview of those skilled in the art. Generally, such cells are assembled in a controlled environment and then sealed with some type of case structure.

The following, non-limiting examples serve to illustrate the processing techniques used to prepare the new class of solid-state electrolytes without the addition of salt.

Example 1

1,3-bis(1-adamantyl)imidazolium lithium phthalocyanine

Purified 1,3-bis(1-adamantyl)imidazolium tetrafluoroborate (0.843 g, 1 eq) was dissolved in 10 mL of acetone and added to a solution of dilithium phthalocyanine (0.991 g, 1 eq) in 100 mL of acetone. The solution was evaporated to 20-30 mL under reduced pressure, sealed and cooled at 5 ° C. for 72 hr. The resulting solid was filtered and redissolved in 125 mL of hot acetone with stirring (some undissolved solid was filtered). The volume was reduced and crystallization was allowed to proceed at 5 ° C. to yield purple crystals (55.3%): m.p. 349-351 ° C.; $^1$H NMR (300 MHz, DMSO-$d_6$) δ 9.35-9.25 (m, 8H, Ar—H), 9.06 (s, 1H, Ar—H), 8.12-8.02 (m, 8H, Ar—H), 8.01 (d, 2H, Ar—H), 2.24-2.09 (m, 18H, Al—H), 1.82-1.62 (m, 12H, Aliph-H); $^{13}$C NMR (75 MHz, DMSO-$d_6$) δ 154.14, 140.05, 131.23, 127.51, 119.31, 59.35, 41.46, 34.81, 28.83; IR (KBr) $cm^{-1}$ 3053, 2912, 1604, 1583, 1485, 1092, 1055. Anal. Calc. for $C_{55}H_{49}LiN_{10}$ (856.99): C, 77.08; H, 5.76; N, 16.34. Found: C, 76.89; H, 5.90; N, 15.94.

Example 2

Tetrabutylammonium Lithium Phthalocyanine

An equimolar amount of tetrabutylammonium bromide (3.168g, 1.01 eq) in 80 mL of dichloromethane was added to purified dilithium phthalocyanine (5.1492 g, 1 eq) in 200 mL of acetone. The mixture was washed 4 times with 200 mL portions of deionized (DI) water in a separatory funnel. The organic layer was filtered, evaporated to approximately ⅒ of the original volume, and cooled at −20 ° C. for 24 hr. The purple crystalline product (64.3 %) was dried in vacuo at 60 ° C. for 6-8 hr: m.p. 245.6-247.9 ° C.; $^1$H NMR (300 MHz, acetone-$d_6$) δ 9.26-9.23 (m, 8H, Ar—H), 7.92-7.89 (m, 8H, Ar—H), 2.89-2.84 (m, 8H, —$CH_2$), 1.33-1.28 (m, 8H, —$CH_2$), 1.06-0.94 (m, 8H, —$CH_2$), 0.65 (t, 12H, —$CH_3$); $^{13}$C NMR (75 MHz, acetone-$d_6$) δ 155.52, 141.73, 128.11, 122.59, 59.09, 24.14, 20.15, 13.67; IR (NaCl) $cm^{-1}$ 3060, 1381, 1331, 1281, 1167, 1115, 1095, 1057, 781, 750. Anal. Calc. for $C_{48}H_{52}LiN_9$ (761.93): C, 75.67; H, 6.88; N, 16.54. Found: C, 75.83; H, 6.95; N, 16.70.

Having described the invention in detail and by reference to preferred embodiments thereof, it will be apparent that modifications and variations are possible without departing from the scope of the invention defined in the appended claims.

What is claimed is:

1. A solid-state electrolyte for rechargeable lithium batteries comprising:
   (a) a large unsaturated aromatic anion selected from the group consisting of di-lithium phthalocyanine and di-lithium porphyrin, wherein one of the lithium ions of the unsaturated aromatic anion is replaced with a nitrogenous cation; and
   (b) a lithium ion charge carrier.

2. The solid-state electrolyte of claim 1, wherein the nitrogeneous cation is selected from the group consisting of tetraalkylammonium, imidazolium, pyridinium, and combinations thereof, wherein the components of the nitrogeneous cation include atoms other than carbon.

3. The solid-state electrolyte of claim 1, wherein the lithium charge carrier is a lithium salt.

4. The solid-state electrolyte of claim 3, wherein the lithium salt is selected from the group consisting of lithium iodide, lithium bromide, lithium chloride, lithium fluoride, lithium bis(trifluoromethanesulfonyl)imide, or mixtures thereof.

5. The solid-state electrolyte of claim 3, wherein a mole ratio of the lithium salt to the unsaturated aromatic anion ranges from 0.1 to 4.5.

* * * * *